United States Patent [19]
Sunaga et al.

[11] Patent Number: 5,653,055
[45] Date of Patent: Aug. 5, 1997

[54] CONTINUOUSLY ASSEMBLED POTS FOR RAISING AND TRANSPLANTING SEEDLINGS

[75] Inventors: Mamoru Sunaga; Hidekazu Terasawa; Sumio Ito; Masashi Tanimura, all of Obihiro, Japan

[73] Assignee: Nihon Tensaiseito Kabushiki Kaisha, Tokyo, Japan

[21] Appl. No.: 547,491

[22] Filed: Oct. 24, 1995

[30] Foreign Application Priority Data

Jan. 31, 1995 [JP] Japan .................................. 7-034328
Mar. 31, 1995 [JP] Japan .................................. 7-099863

[51] Int. Cl.$^6$ ........................................ A01G 7/02
[52] U.S. Cl. ................................ 47/66.5; 47/74
[58] Field of Search ........................ 47/66 A, 66 I, 47/74, 56

[56] References Cited

U.S. PATENT DOCUMENTS

| | | | |
|---|---|---|---|
| 3,515,036 | 6/1970 | Oki et al. | |
| 4,215,513 | 8/1980 | Dedolph | 47/56 |
| 4,620,390 | 11/1986 | Mekler | 47/56 |
| 5,101,594 | 4/1992 | Ahm | 47/66 A |

FOREIGN PATENT DOCUMENTS

| | | | |
|---|---|---|---|
| 97735 | 1/1984 | European Pat. Off. | 47/66 A |
| 3049576 | 7/1982 | Germany | 47/66 A |
| B-54-28327 | 9/1979 | Japan . | |
| 55-30805 | 8/1980 | Japan . | |
| B-58-11817 | 3/1983 | Japan . | |
| B-59-20325 | 5/1984 | Japan . | |
| B-59-22489 | 5/1984 | Japan . | |
| B-63-61886 | 11/1988 | Japan . | |
| 2-23640 | 1/1990 | Japan . | |
| B-2-6682 | 2/1990 | Japan . | |
| B-4-79612 | 12/1992 | Japan . | |
| A-5-308822 | 11/1993 | Japan . | |

*Primary Examiner*—Henry E. Raduazo
*Attorney, Agent, or Firm*—Oliff & Berridge

[57] ABSTRACT

Continuously assembled pots, configured in square or hexagonal cylinders for raising and transplanting seedlings are formed by developing non-adhered portions of a band, which is formed by adhering two sheets of film such as paper or the like. The portion of the band corresponding to a connector portion which connects the pots is folded at a given length, and has an elongated or unfolded length larger than the width of one side of a pot. The folded portion of the band is adhered to itself and to a pot with a water soluble paste, so that the continuously assembled pots are separated by water during raising and pulled out continuously from one end thereof in a line.

8 Claims, 18 Drawing Sheets

CONTINUOUSLY ASSEMBLED POTS FOR RAISING AND TRANSPLANTING SEEDLINGS

BACKGROUND OF THE INVENTION

1. Field of the Invention

The present invention relates to continuously assembled pots for raising and transplanting seedlings (hereinafter referred to as "PRTS") for use of the crops such as rice plant, beet, vegetables and flowers.

2. Description of Related Art

In this type of PRTS, individual square or hexagonal cylinder bottomless pots to be formed by developing a film consisting of two adhered sheets of paper or paper-like are connected by a connector portion to make a continuous band (hereinafter referred to "band"), and a plural number of bands are overlapped and adhered to each other with a water-soluble paste( see for instance Patent publication Nos. Sho 54-28327, 58-11817 and Hei 4-79612). According to such PRTS, at the time of storage, it is flattened, and at the time of using, it is developed to form a honeycomb like structure of continuously assembled pots, in which cultivation soil is and seeds are filled individually in the pots to raise many seedlings concentrically. After raising seedlings in a given number of days, by drawing one end of such assembled pot seedlings, each pot seedlings is drawn out continuously in a line because the mutual adhesion between overlapped bands is separated, thereby such individual pots including seedlings are transplanted effectively.

A leading pot seedling of the pot seedlings drawn out is in general adapted to be separated at the connector portion by interrupting the trailing pot seedling by a rotary stopper and the separated pot seedling is transplanted individually. For instance, in the Japanese Patent Publication No. Sho 63-61886, there is disclosed a planting machine in which, while drawing out the pot seedlings by clamping the pot with the planting levers, the pot is separated at the portion cut-in in advance at the connector portion due to interruption with a stopper, and the pot seedling is transplanted in a field. However, such planting machine is large-sized, and has to be used together with a large-sized agricultural working vehicle such as a tractor, which has been a limitation when transplanting in a plantation house having a small area.

Accordingly, in recent years in Japanese Patent Laid-open No. Hei 5-308822, a plantation machine has been disclosed, which comprises a pot seedlings placing portion, a pot seedlings guiding portion, along which a line of drawn out pot seedlings is guided, and a sleigh body, which feeds individual pot seedlings from the pot seedlings guide portion, wherein along with the sliding of the sleigh body, the line of pot seedlings drawn out are continuously transplanted in the ridge formed by a ridge opener provided on the bottom of the sleigh body. According to the planting machine, the sleigh body can be drawn by hand or with a handy tractor to plant seedlings continuously, thereby the usability thereof is increased widely.

However, in the conventional PRTS, since it is formed by adhering the above bands in turns using water-soluble paste, the dimension of the connector portion between pots is limited to the dimension of one side of individual pot. As a result, when using such a transplanting machine as disclosed in the Patent Laid-open No. Hei 5-308822 to transplant continuously in a ridge, the spacing between seedlings is limited by the dimension of the connector portion, so that, according to the kind of the seedlings to be transplanted at a longer spacing than the regular spacing, the plantation has to be given up.

The present invention has been made in the light of the above conventional problem and the purpose of which is to provide a new PRTS contributing to increase the usability of the transplanting machine, in which the length of the connector portion can be set arbitrarily according to the spacing between the roots without losing the advantage of PRTS and separating each pot from a line of pots seedlings.

SUMMARY OF THE INVENTION

The present invention is characterized in that, in a PRTS having square or hexagonal pots to be formed by developing a plural number of bands adhered to each other in overlapping manner, each of which is formed by adhering two sheets of film such as paper or paper like with water-resistant paste at the connector portion, said connector portion has the portion elongated by the dimension of more than one side of each pot.

The present invention further is characterized in that, in a PRTS having square or hexagonal pots to be formed by developing a plural number of bands adhered to each other in overlapping manner with a water-soluble paste, each of which is formed by adhering two sheets of film such as paper or paper like with water-resistant paste at the connector portion, said connector portion has the portion elongated by the dimension of more than one side of each pot to be formed, and the elongated portion is adhered on one side of a pot located either at the front or rear in a folded manner with a water-soluble paste.

Further, the object of the present invention is to increase the usability of a transplanting machine by making use of a PRTS having an elongated portion of the connector portion without separating individual pots.

The present invention comprises, further in order to attain the above object, a band consisting of two sheets of film such as paper or the like pasted at connector portions with a water resistant paste, is adapted to form hexagonal pots by developing said band at the portion not adhered, the connector portion of which has an elongated portion 5 times the length of one side of the pot, and two bands are overlapped in such a manner as each pot of both bands is located at the center of the connector portion of the opposing band and adhered each other with a water-soluble paste to form one unit, and a plurality of units are laminated in such a manner as each unit is shifted by the dimension of two sides of the pot and adhered with a water-soluble paste.

In the present invention, the above connector portion is preferably to be elongated by the dimension of any integer times more than twice of integer of one side of the pot, but not limited to any integer times.

And, the above laminated bands can be constituted by being adhered through the folded portion of the elongated portion of the connector portion.

In the present invention, the above band can be formed, as disclosed in Japanese Patent Publication No. Sho 58-11817 or Hei 4-79612, either with two sheets of film, and the individual pot is constituted from the not-adhered portion and the connector portion from the adhered portion of these films, or with, as disclosed in Japanese Patent Publication No. Sho 54-28327, one sheet of film, and the portion corresponding to pots are divided into a plurality of strips by cutting horizontally and in parallel, and every other strip is developed in opposite directions to form pots. Further, such band can be formed also by adhering every other individual pot portion and individual connector portion with a water resistant paste.

In the present invention, the material for such film is not limited to a certain kind but at least it has to be undecayable during raising seedlings. This raising seedling period lasts approximately 40 days in general, in the case of spring onion or onion, it lasts 40–90 days or more. As a material having decay-resistance of more than 40 days, for instance, a plant fiber paper impregnated or mixed with an antiseptic or a synthetic paper made by mixing a natural pulp with a synthetic fiber is used. The material having decay-resistance of 40–90 days or more, is disclosed in Japanese Patent Publication No. Hei 2-23640, in which a decay resistant paper is mixed with a synthetic fiber having a humidity strength obtained by being treated with an agent. A decay resistant non-fabric sheet, is disclosed in Japanese Patent Publication No. Sho 59-20325, and a paper, is disclosed in Japanese Patent Publication No. Hei 2-6682, which is obtained by treating a chemically changed paper with an agent or paper mixed with synthetic fiber treated with a decay resistant agent such as antiseptic agent.

Further, in the present invention, kinds of water-soluble paste are optional, for instance, chemical compounds such as polyvinyl alcohol, a polyacryl acid and a polyethylene oxide or selectable from the natural material such as gum arabic, pastes and carboxymethylcellulose. And, as a water-insoluble paste, chemical compounds such as a polyaceticacidvinyl emulsion, an epoxy resin emulsion and hot-melt adhesive can be used.

In the PRTS thus constituted, by adhering the elongated portion of the connector portion on the side of individual pot, the tight assembly state is secured. And, the adhesion between the mutual folded portions of the connector portion and between the side and the elongated portion is released easily by water during raising seedlings, which allows the connector portion to be drawn out continuously in an elongated manner.

DETAILED DESCRIPTION OF THE PREFERRED EMBODIMENTS

Figure 1:
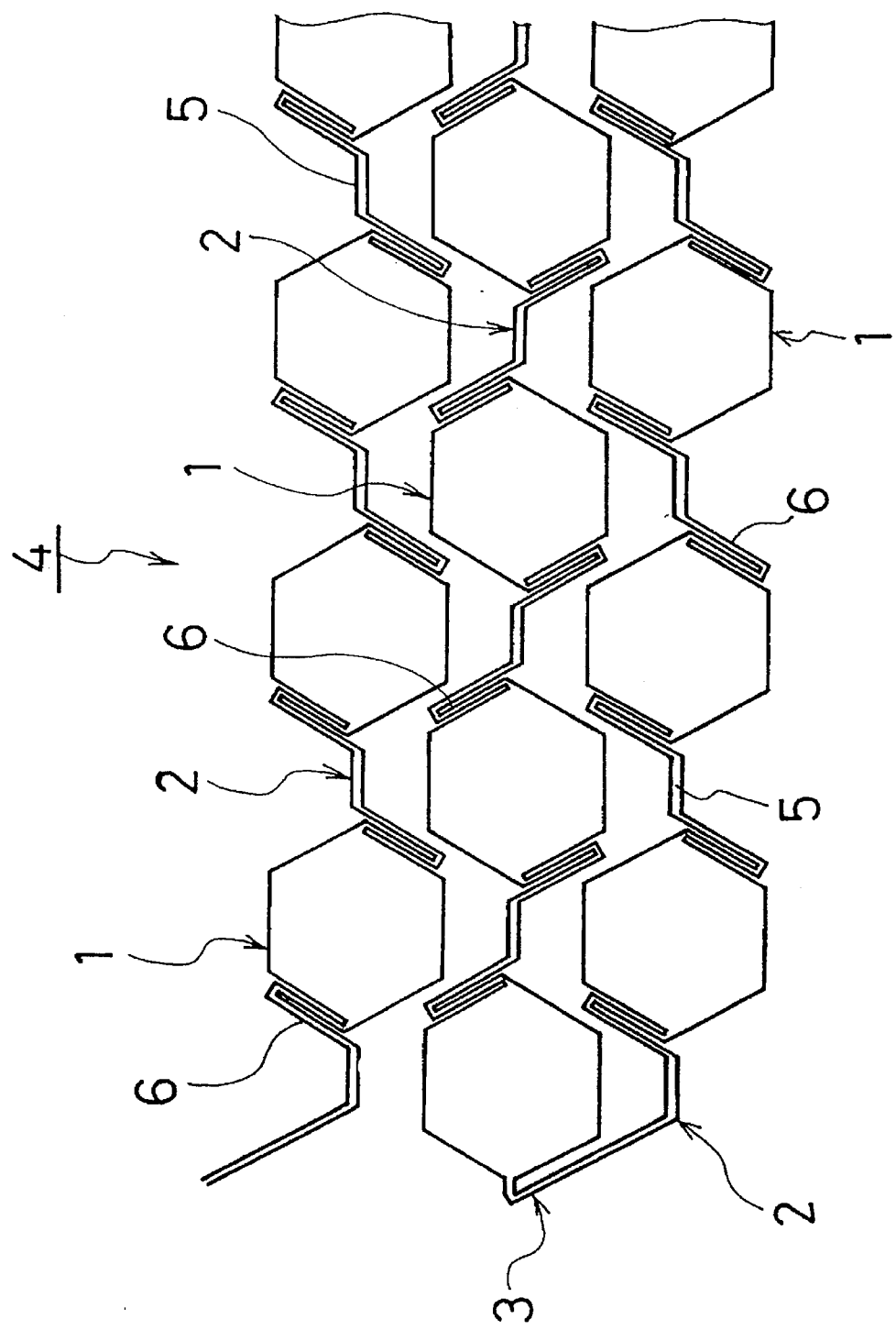
FIG. 1 is a plan view of the structure of the PRTS illustrating a first embodiment of the present invention.
Figure 2:
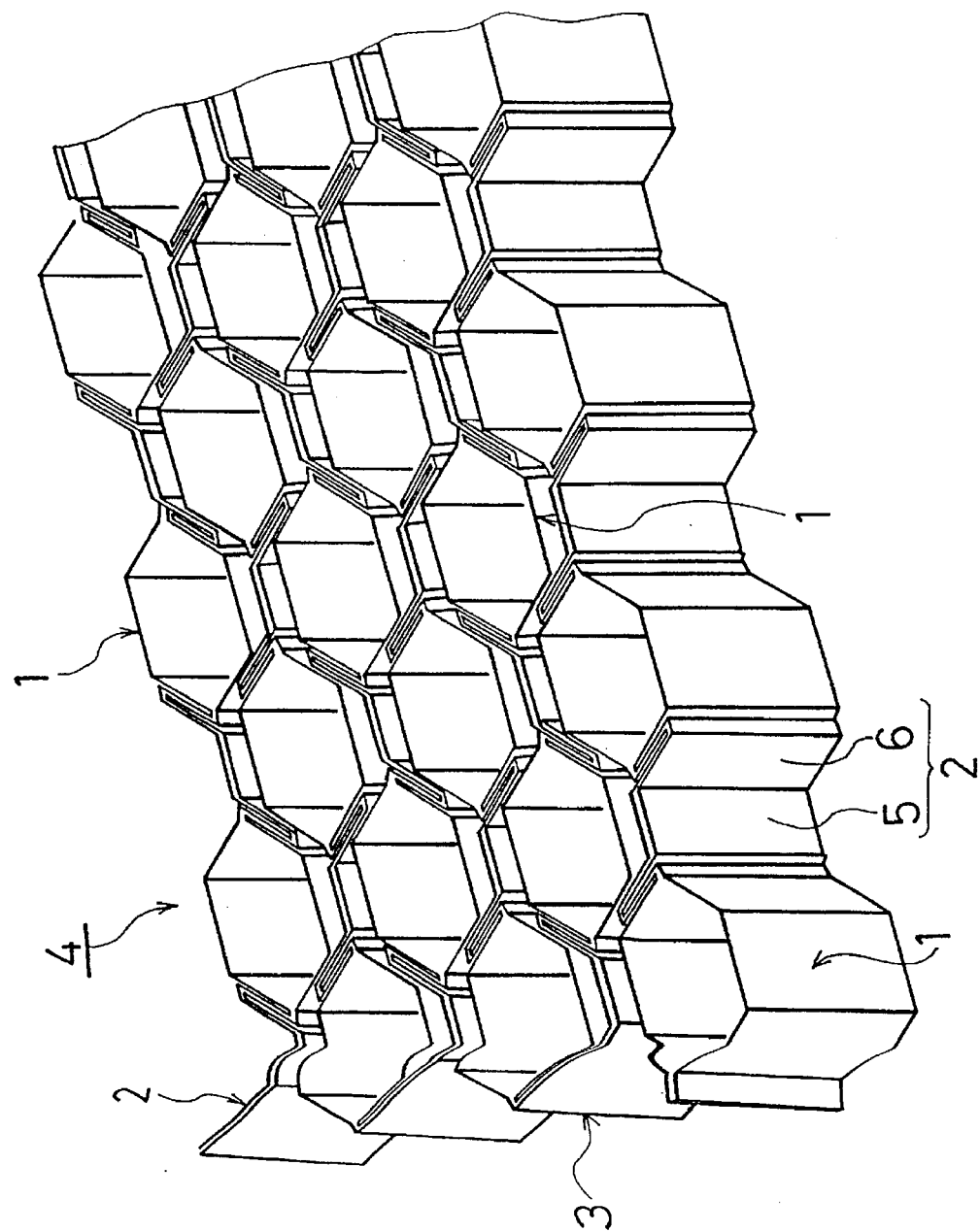
FIG. 2 is a perspective view of the structure of the PRTS shown in FIG. 1.

FIGS. 1 and 2 show the first embodiment of the present invention. In this first embodiment, it is constituted by assembling a plurality of hexagonal cylinder pots 1, each of pots 1 is connected through a connector portion 2. These pots 1 and connector portions 2 form a series of continuous band 3, which is folded at every given length thereof in such a manner as each pot to be overlapped each other is shifted by ½ pitch, which forms an assembled body 4. The connector portion 2 consists of a flattened portion 5 and two folded portions 6 connected to the front and the rear of said flattened portion 5. Each folded portion 6 is adhered to each other with a water-soluble paste and adhered to one side of the pot located at the front thereof and to one side of the pot located at the rear thereof with a water-soluble paste. And, the folded continuous band is mutually adhered with a water-soluble paste, thereby the assembled body 4 can be maintained in its tightly assembled state with the pots. Note that in figures for making the understanding easier, a space is provided between the laminations between the folded continuous band 3.

Now, the total length of the connector portion 2 is set by 5 times of one side of each pot 1, while the dimension of the flattened portion 5 thereof is set identical with one side width. Accordingly, when developing or unfolding said folded portion 6, the length of the unfolded elongated portion becomes twice of one side of the pot. It is a matter of course that the folded portion 6 may be adhered on either side of the pot 1 and that the folding times of the elongated portion of the connector portion 2 may be arbitrary according to the length of elongation, and further, the folding may be provided merely on one side of the flattened portion 5. For instance, in case the length of the elongated portion is set by 3 times of one side of each pot, the folded portion 6 is provided merely either on the front portion Of the flattened portion 5 or on the rear portion to be adhered on either side of the pot 1.

Figure 3:
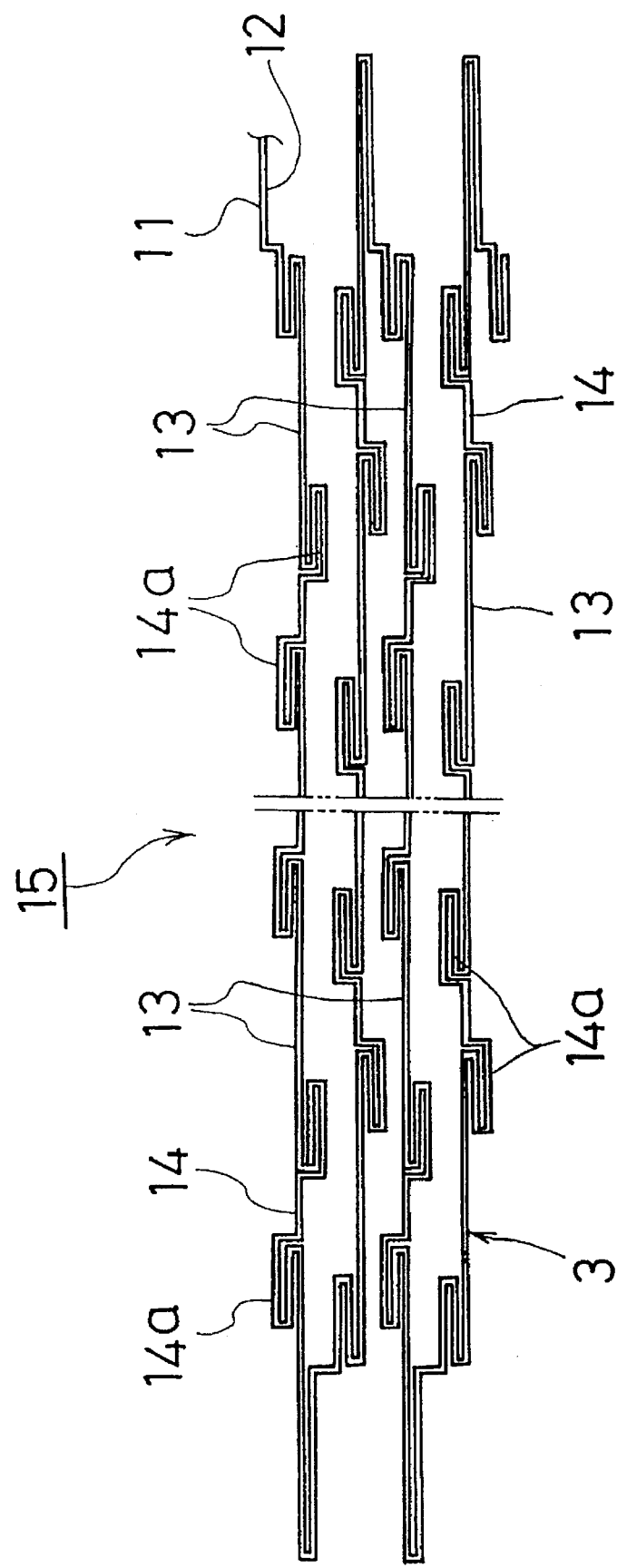
FIG. 3 is a side view of a flattened PRTS shown in FIG. 1.

In this first embodiment, the above continuous band 3 is prepared by overlapping two films 11, 12 such as paper or the like having decay resistance as shown in FIG. 3. In this case, the portion corresponding to the individual pot 1 is formed as a not-adhered portion 13 of two films 11, 12, and the portion corresponding to the connector portion 2 is formed as an adhered portion 14. The band 3 is supplied initially with its non-adhered portion 13 flattened and it is folded at a given length in turn to form a laminated body 15. Both ends of the adhered portion 14 of the band 3 are folded in an opposite direction each other, and this folded portion 14a is adhered with a water-soluble to the not-adhered portion 13. Further, the folded bands 3 mutually are adhered in the area of not-adhered portion 13 adjacent to the folded portion 14a with a water-soluble paste.

In PRTS thus constituted, when developing or preparing the laminations 15 in the direction normal to the surface of the laminations 15, the not-adhered portion 13 is developed respectively to form, as shown in FIGS. 1 and 2, a plurality of pots which are developed like a honeycomb to obtain a given amount of assembled body 4. When raising seedlings, such assembled body 4 is set in a seedling box (not shown) keeping developed, and each pot is filled with cultivation soil, and seeded therein. And, after raising seedlings for a given days, transplantation is carried out by using a transplantation machine, for instance, as disclosed in Japanese Patent Laid-open No. Hei 5-308822.

In this case, since said folded portions 6 of the connector portions 2, and the folded portions 6 and individual pot 1 are mutually adhered with a water-soluble paste, each adhered portion is separated by the humidity during seedling. Thereby when drawing one end of the assembled body 4, the folded portions are straightened and each pot 1 is pulled out continuously through the straightened connector portions 2. Accordingly, by setting the length of the connector portion 2 in advance according to the crops, the seedlings are transplanted at a given spacing between roots.

Figure 5:
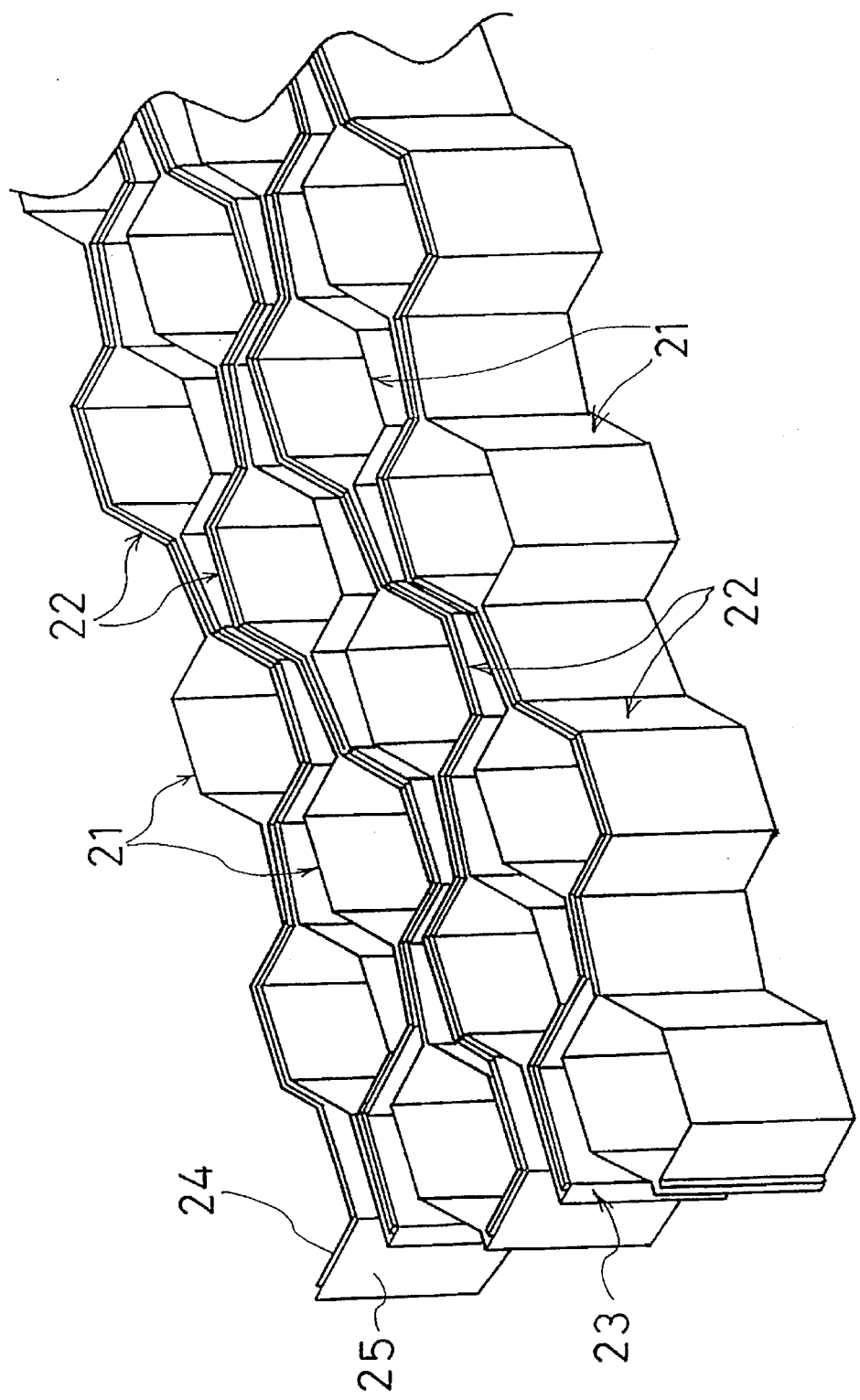
FIG. 5 is a perspective view of the structure of the PRTS shown in FIG. 4.
Figure 6:
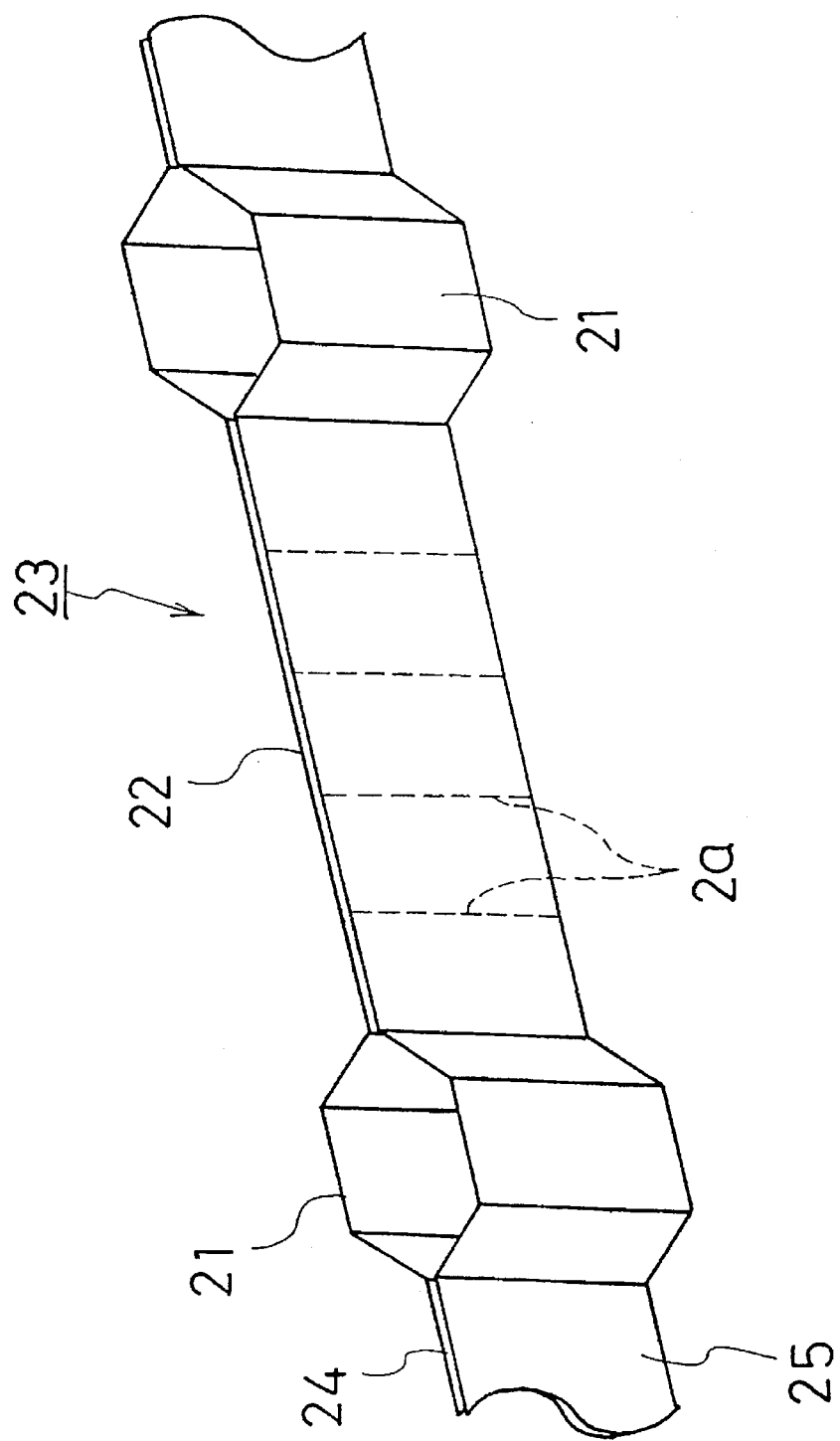
FIG. 6 is a perspective view of a band constituting the PRTS shown in FIGS. 4 and 5.
Figure 7:
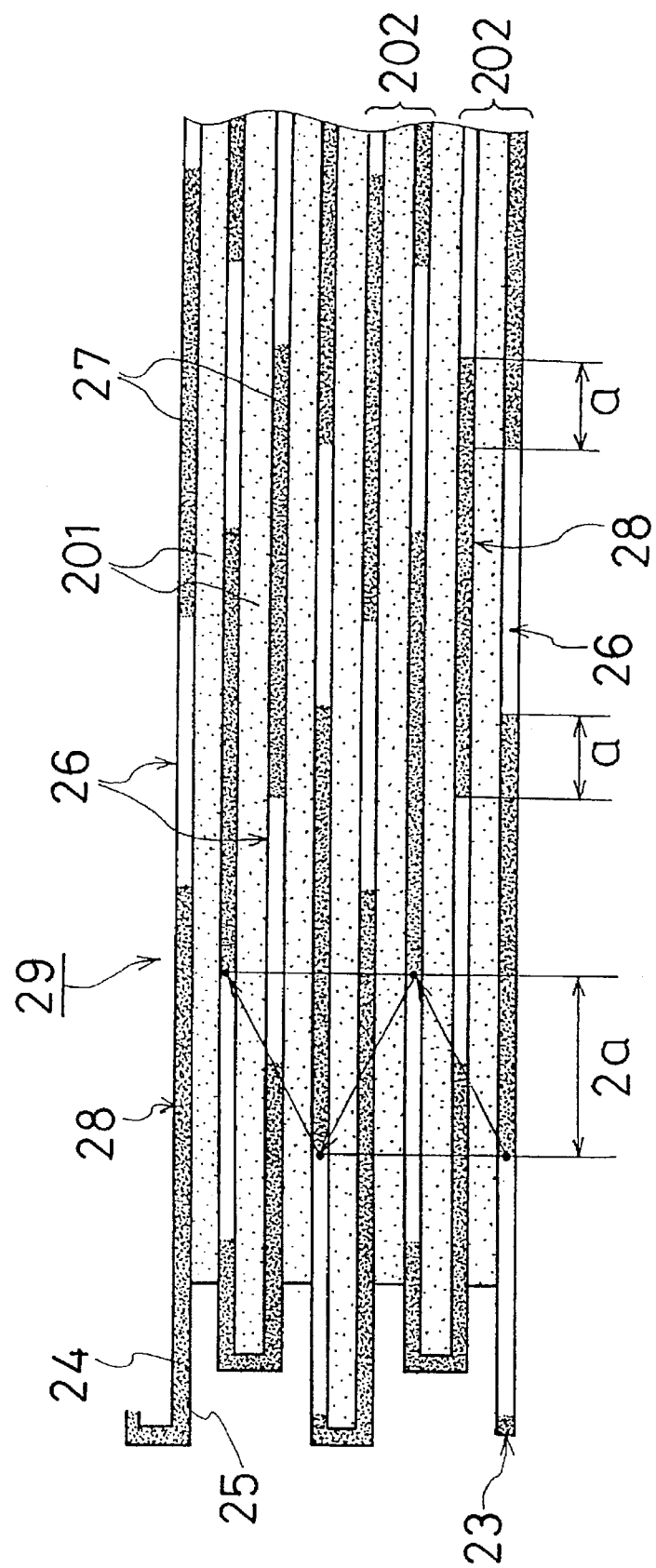
FIG. 7 is a side view of a flattened PRTS shown in FIGS. 4 and 5.

FIGS. 4–7 show the second embodiment of the present invention. In these figures, the reference numeral 21 shows a hexagonal cylinder pot, 22 shows the connector portion connecting the hexagonal pots 22, which has a length of 5 times of one side of an individual pot. The individual pot 21 is assembled tightly in an assembled body like a honeycomb by folding alternately at a given pitch a series of bands 23 including said individual pot 21 and the connector portion 22. The band 23 is formed by overlapping two sheets of film 24, 25 such as paper or paper like having undecayable property. As shown in FIG. 7, the portion corresponding to said individual pot 21 is formed as a not-adhered portion 26 of the films 24, 25 and the portion corresponding to the connector portion 22 is formed as an adhered portion 28 of the films 24, 25 using a water resistant paste 27.

Figure 4:
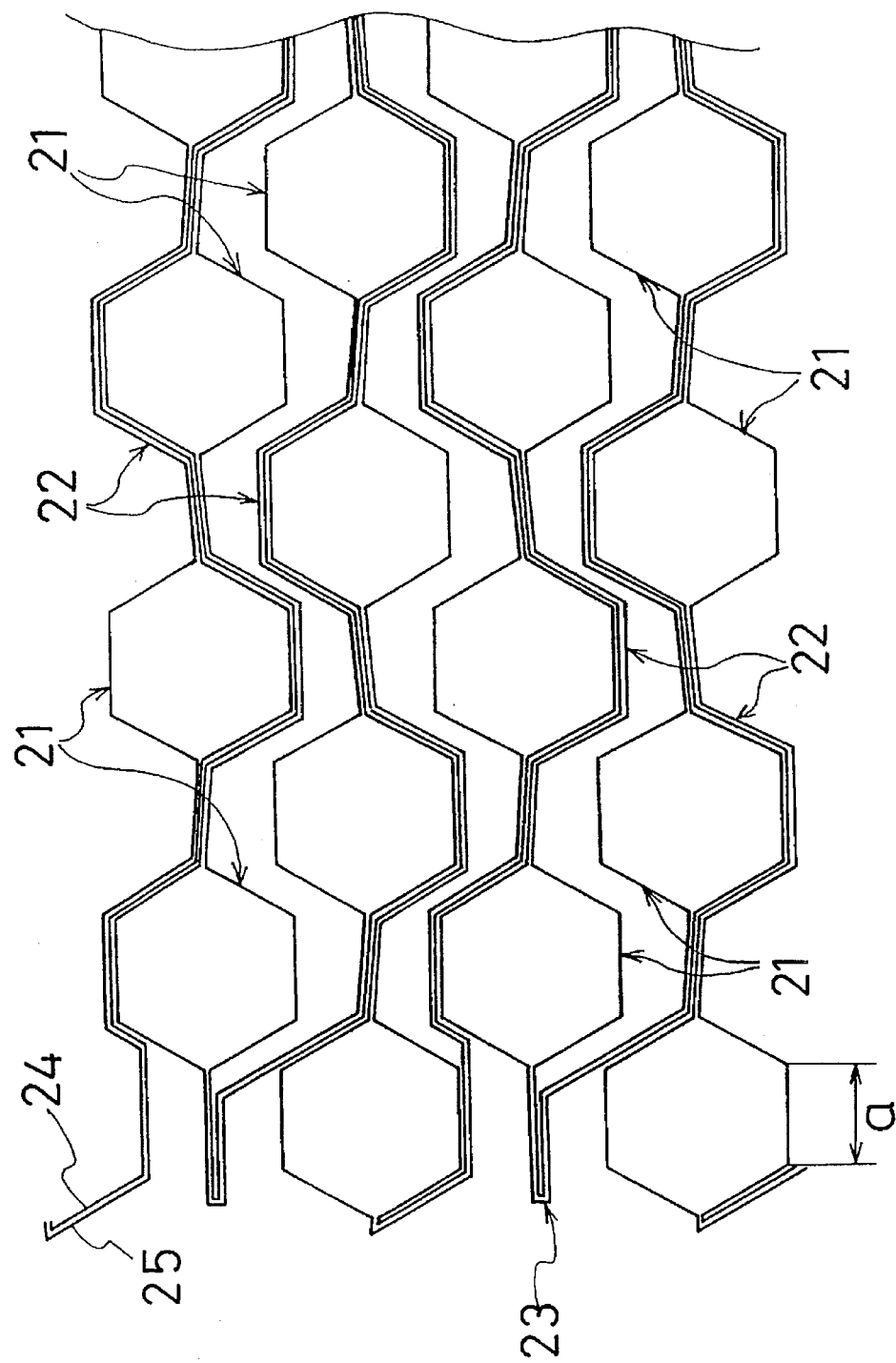
FIG. 4 is a plan view of the structure of the PRTS illustrating a second embodiment of the present invention.

The band 23 is formed as a laminations 29 which is formed by being folded while the not-adhered portion 26 is flattened initially. And, in the laminations 29, the band 23 is mutually adhered with a water-soluble paste 201. Accordingly, when pulling this lamination in the direction of normal to the surface of the laminations 29, the not-adhered portions 26 are developed to form a honeycomb-like plural number of pots as shown in FIGS. 4–6. In these figures, for assisting to understand the constitution of the laminations each layer thereof is shown spaced from each other. Further, in the connector portion 22, folds 2a (FIG. 6) are provided at the same pitch as one side width a of the individual pot.

In the above lamination 29, as shown in FIG. 7, the band 23 is overlapped in such a manner that the not-adhered portion 26 (individual pot 21) is positioned at the center of the adhered portion 28 (connector portion 22) to form a laminated body 202 as one unit. The plural number of units of the laminated body 202 are overlapped with each other in turn and are shifted by the width of 2a of the individual pot 21. Accordingly, based on the band 23, the not-adhered portion 26 (individual pot 21) and the adhered portion 28 (connector portion 22) are located at the same phase every 5th layer.

To use the thus formed PRTS, as shown in FIGS. 4 and 5, the laminations 29 is developed and set in a raising seedlings box (not shown) and each pot 21 is filled with the cultivation soil and it is seeded. After a given days of raising seedlings, the pots are transferred to a transplanting machine disclosed in the Japanese Patent Laid-open No. Hei 5-30822 in the box or by taking out from the box, and while sliding the transplanting machine, the seedlings are continuously transplanted. While transplanting, since the individual pot 21 and the connector portion 22 are adhered with a water-soluble paste 201, within the laminated body 202 and between two laminated bodies 202, each adhered portion is separated by getting submerged, thereby when pulling one end of PRTS, each pot seedling 21 is drawn out continuously through a long connector portion 22. Therefore, in accordance with the sliding of the transplanting machine the seedlings can be transplanted at a broad spacing of roots.

Figure 8:
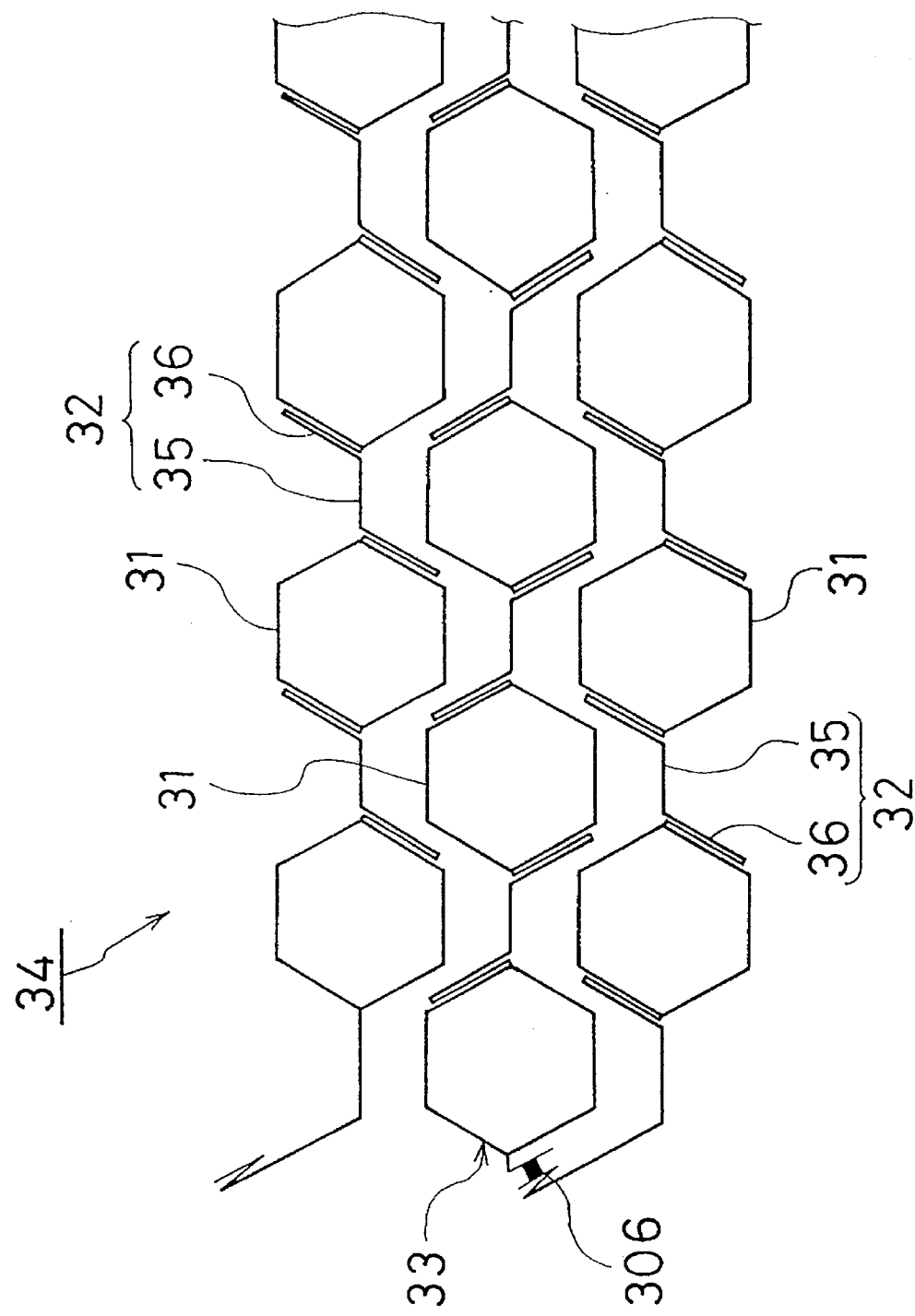
FIG. 8 is a plan view of the third embodiment of the PRTS according to the present invention.
Figure 9:
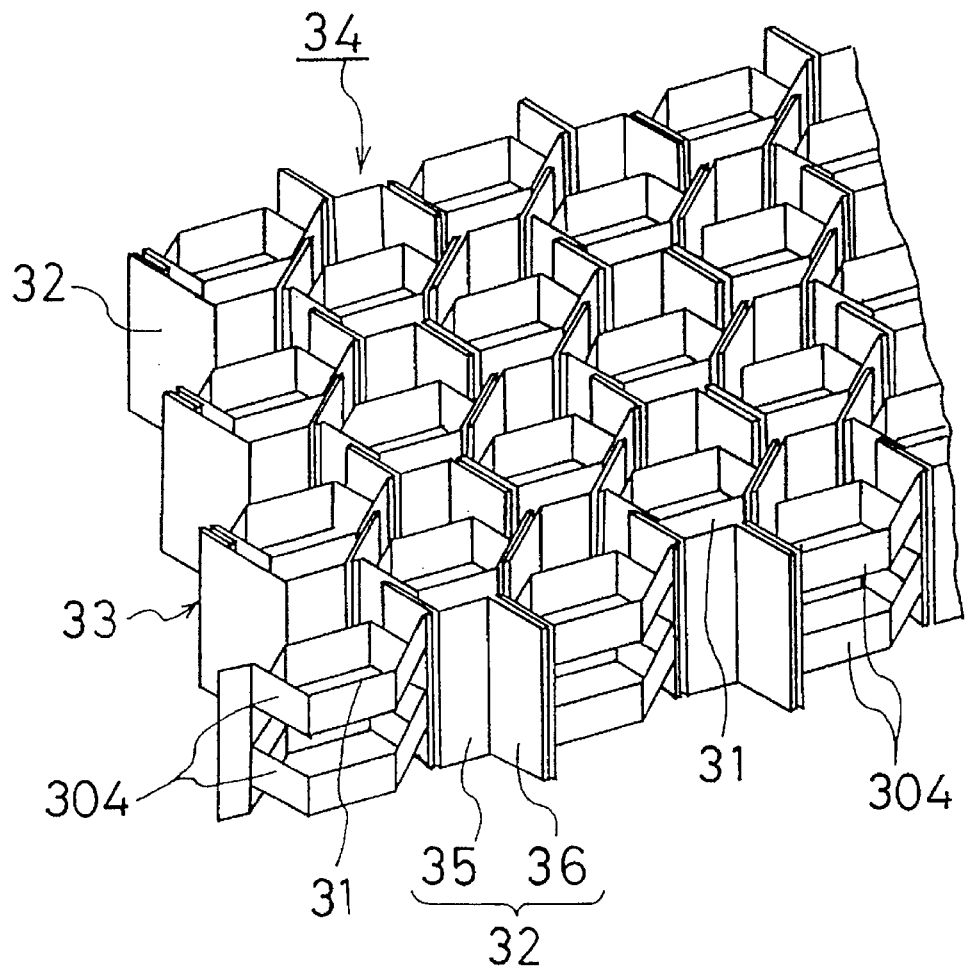
FIG. 9 is a perspective view of the structure of the PRTS shown in FIG. 8.
Figure 10:
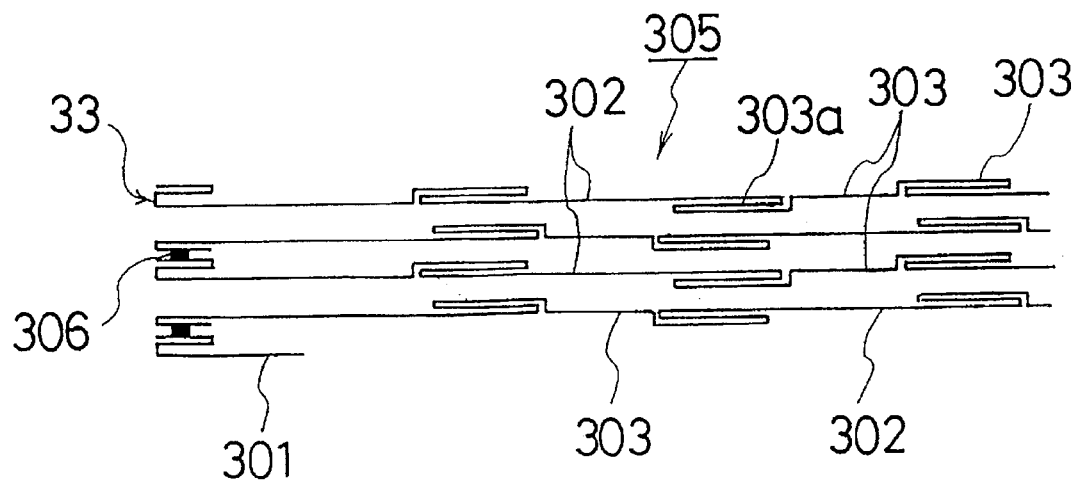
FIG. 10 is a side view of a flattened PRTS shown in FIG. 8.

FIGS. 8–10 show the third embodiment of the present invention. In this third embodiment, as well as in the above first embodiment, a plural number of hexagonal cylinder pots 31 are assembled, in which a band 33 is formed by connecting individual pot 31 with a connector portion 32. By overlapping these bands 33, at every given length, an assembled body 34 is formed, and the connector portion 32 is constituted from a flattened portion 35 and folded portions 36 located at the front and the rear portion of the flattened portion 35, and the bands 33 are overlapped by adhering the folded portions 36 with a water soluble paste. The total length of the connector portion 32 is as well as in the first embodiment is set by 5 times of one side width of the individual pot 31, in which the length of the folded portion 36 (elongated portion) is set as twice of one side of the individual pot 31.

In this third embodiment, the above band 33 is formed, as shown in FIG. 10, with a sheet of film 301 such as a paper or the like having an undecayable property. In this case, the portion corresponding to the above individual pot 31 is formed as a cut-in-portion 302 and the portion corresponding to the above connector portion 32 is formed as a no cut-in-portion 303. The above cut-in-portion 302 is formed in a plurality of horizontally divided strips 304 (FIG. 9) and said strips are drawn in opposite direction alternately to form an individual pot 31, while no cut-in-portion 303 becomes a connector portion 32 having a folded portion 36 and a flattened portion 35.

The folded portions 303a of the no cut-in-portion 303 of a band 33 are adhered on the front and rear of the cut-in-portion 302 directing oppositely with a water-soluble paste. Since the cut-in-portion 302 is divided into a plurality of horizontal strips 304, and those strips are adhered to the front and the rear portion of the cut-in-portion 302 alternately. By pulling the folded portions 303a of the no cut-in-portion 303 between different bands in the mutually opposite directions, the divided strips 304 of the cut-in-portion 302 are developed in alternately opposite directions to form individual pots 31. The band 33 is cut at a given length and overlapped to form a lamination 305. The folded portions 303a of the no cut-in-portion 303 are adhered mutually between the folded pieces with a water-soluble paste, and on the other hand, in each band 33, the strips adjacent to each folded portion 303a of the no cut-in-portion 303 are adhered to that folded portion 303a. Thereby, when developing the laminations 305, an assembled body 34 with plural pots is formed. In this case, the openings between the strips 304 of the cut-in-portion 302 are blocked with the flattened portion 35 and the folded portion 36 which form the connector portion 32. Accordingly, when filling individual pots cultivation soil is not leaked from the pot. Further, the cut end of the band 33 is partially folded and connected with a water-resistant paste 306 (FIGS. 8 and 10).

Figure 11:
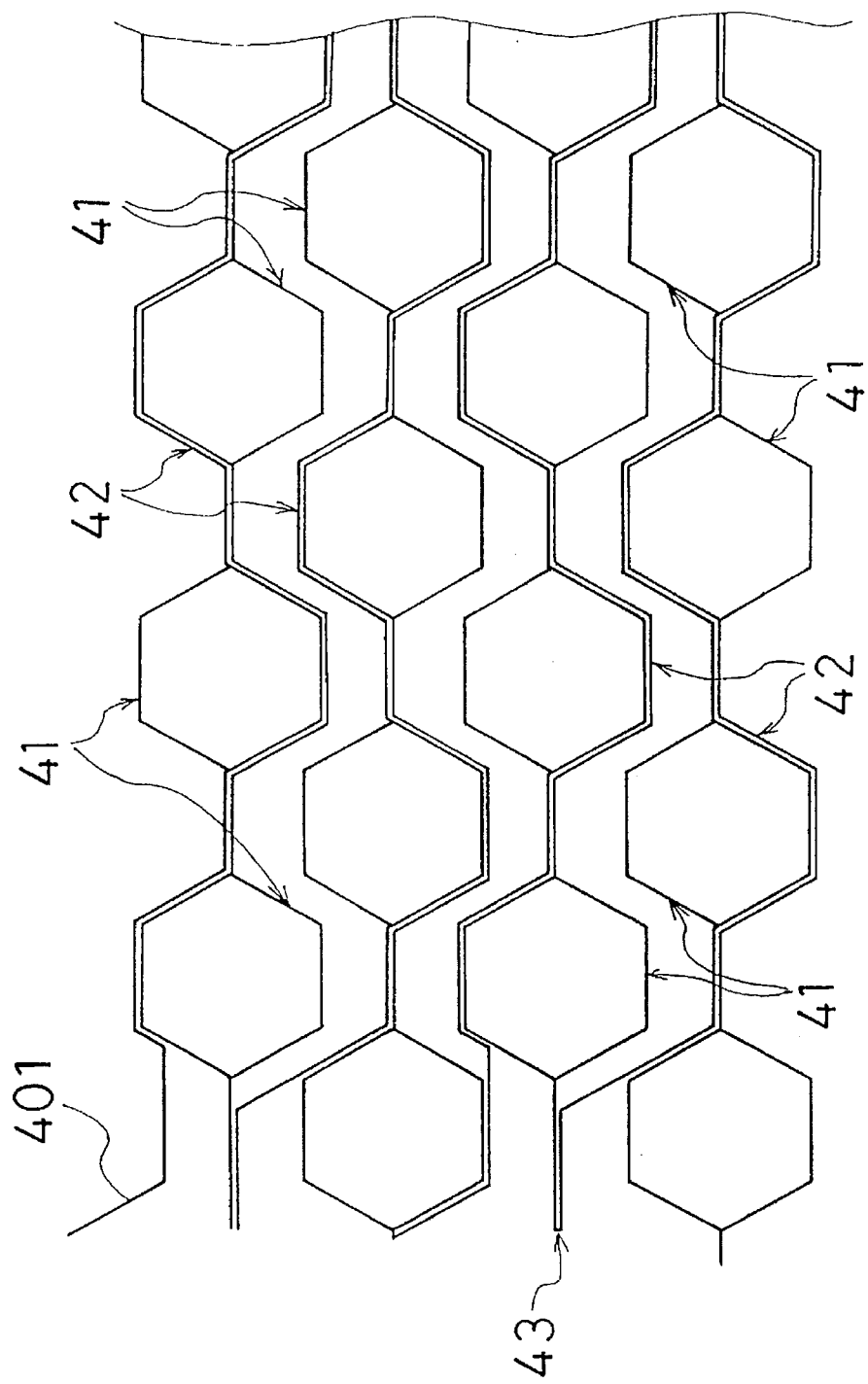
FIG. 11 is a plan view of the fourth embodiment of the PRTS according to the present invention.
Figure 12:
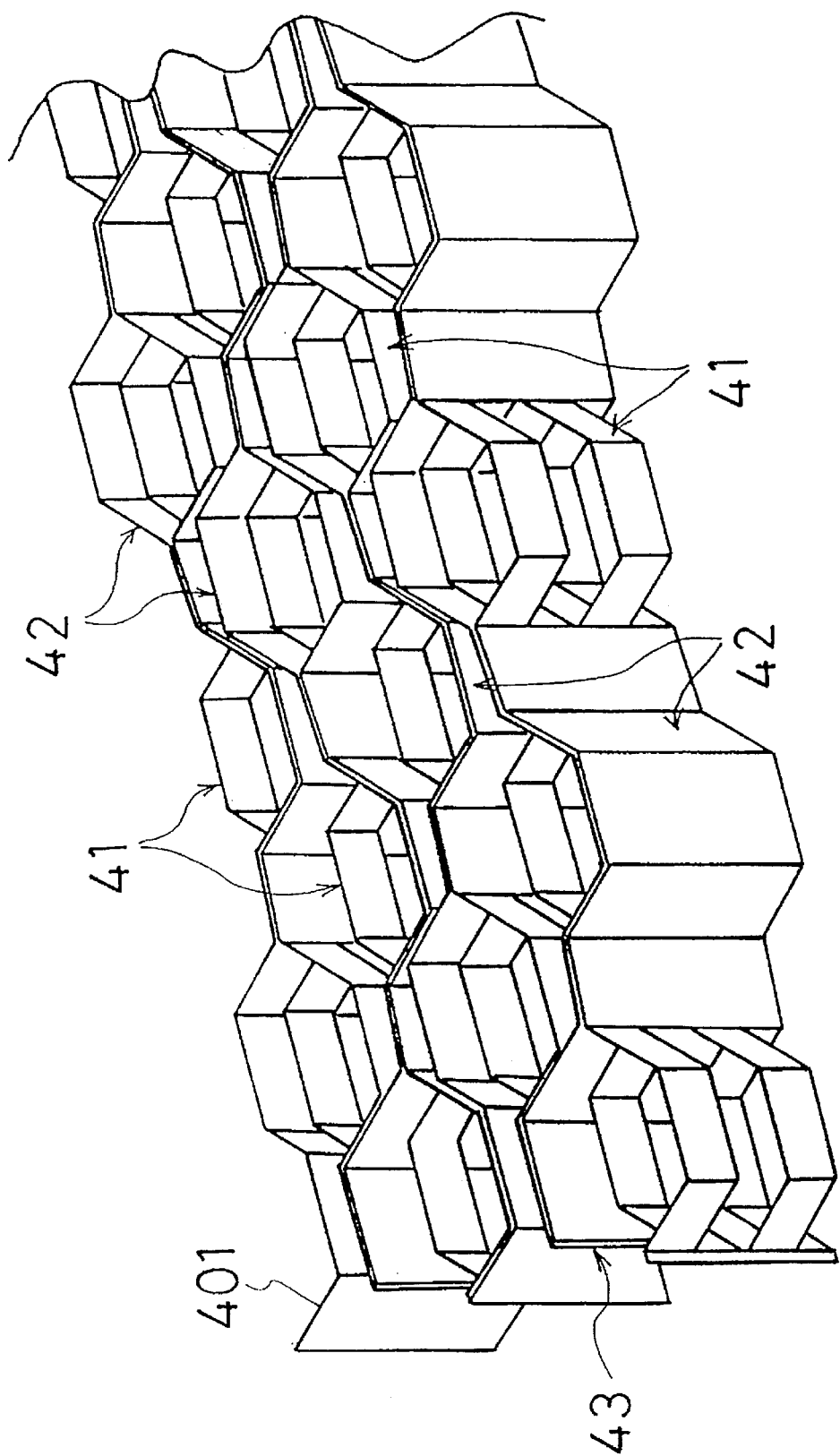
FIG. 12 is a perspective view of the structure of the PRTS shown in FIG. 11.
Figure 13:
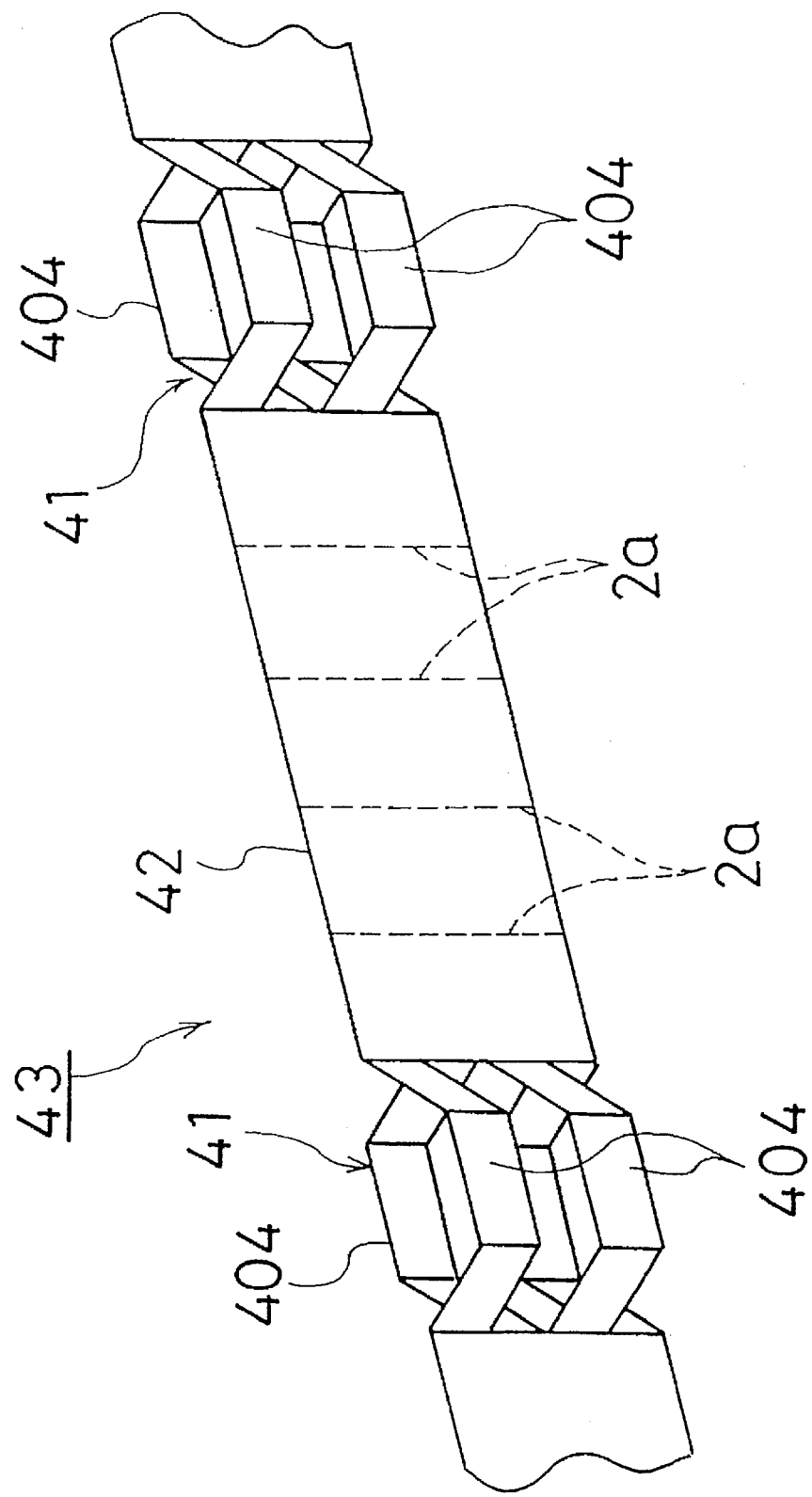
FIG. 13 is a perspective view of the band constituting the PRTS shown in FIGS. 11 and 12.
Figure 14:
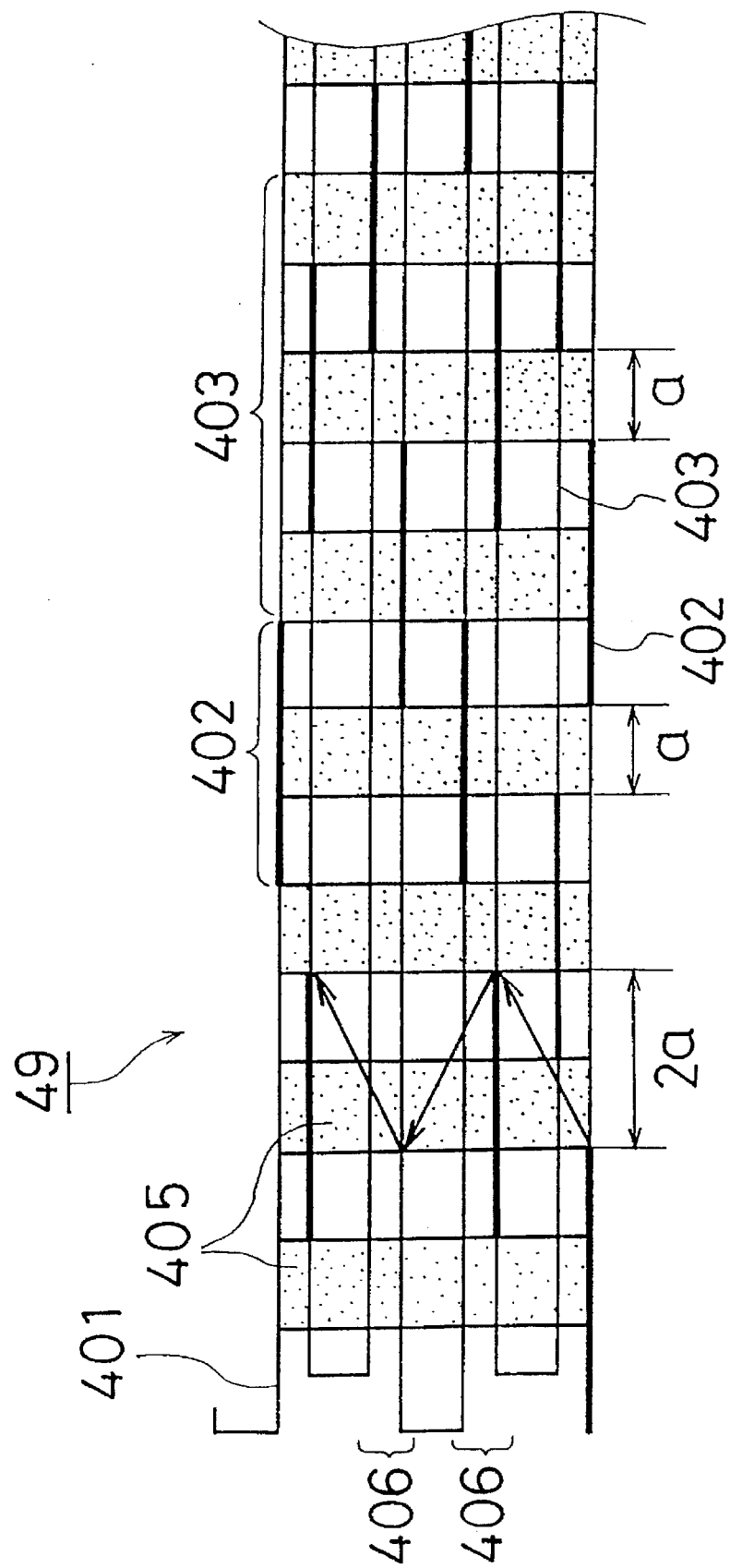
FIG. 14 is a side view of a flattened PRTS shown in FIGS. 11 and 12.

FIGS. 11–14 illustrate the fourth embodiment of the present invention. The features of the fourth embodiment reside in that the above band 33 of the third embodiment is formed without any folded portion, using a sheet of film 43 such as a paper or the like having decayable property. In this case, the individual pots 41 of the band 43 corresponding to the individual pot 31 are formed by cutting in plural number in a longitudinal direction to form a cut-in-portion 402 (bold line in FIG. 14) and the portions corresponding to the above connector portion 32 are formed as no cut-in-portion 403. Whereas the cut-in-portion 402 becomes individual pots 41 by developing a plurality of divided strips 404 alternately in opposite direction (FIG. 13). The no cut-in-portion 403 has the length of 5 times of one side width a as well as the second embodiment. In addition, folds 2a (FIG. 13) are applied thereto at the same pitch as one side of the individual pot 41.

In this fourth embodiment, the band 43 is adapted to be supplied initially as a lamination 49 which is formed by folded at a given pitch as well as in the first embodiment, while the cut-in-portion 401 is kept flattened. In this lamination 49, the bands 43 are adhered with a water soluble paste 405. Further, the cut-in-portion 401 is divided horizontally in plural number of strips 404 and those are adhered alternately to the opposing no cut-in-portion 403. And, this lamination 49, as well as in the first embodiment, is formed by overlapping each band 43 in such a manner as the cut-in-portion 401 is overlapped on the central portion of the no cut-in-portion 403 (connector portion 42) to form a lamination 406. Laminating a plural number of such laminations 406 to form one unit is obtained by overlapping each and displacing alternately by two sides width 2a of the individual pot 41.

Accordingly, when developing said laminations 49 in the normal direction, the divided strips 404 are developed alternately in opposing direction to come out as a plurality of individual pots 41 like a honeycomb as shown in FIGS. 11–13, which enables it to be used as in the first embodiment. Further, in the development the openings between the divided strips 404 of the individual pot 41 are blocked with the adjacent connector portion 42 and the divided strips 404 of the individual pot 41, so that the cultivation soil filled with the pot 41 is prevented from being leaked out.

Figure 15:
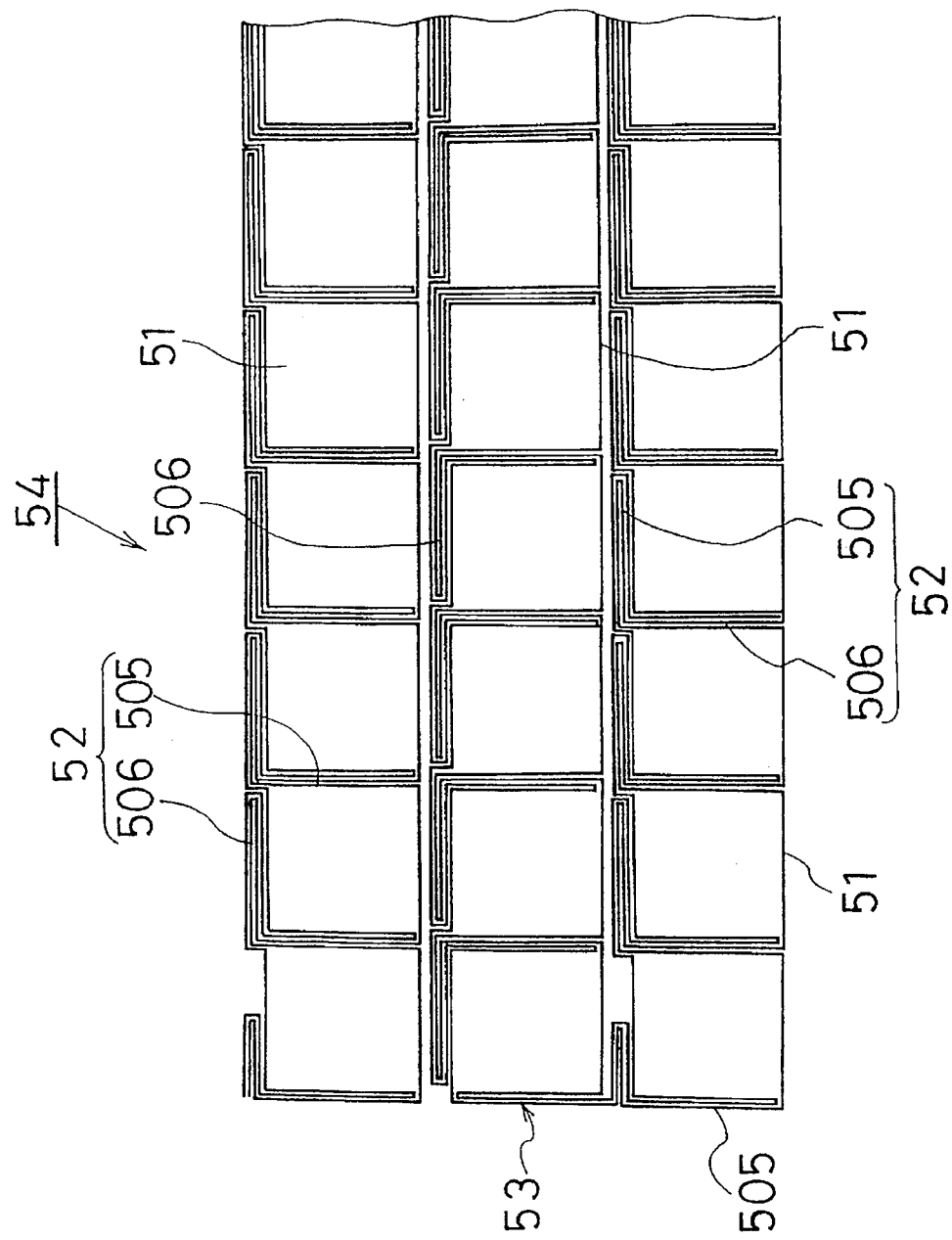
FIG. 15 is a plan view of the fifth embodiment of the PRTS according to the present invention.
Figure 16:
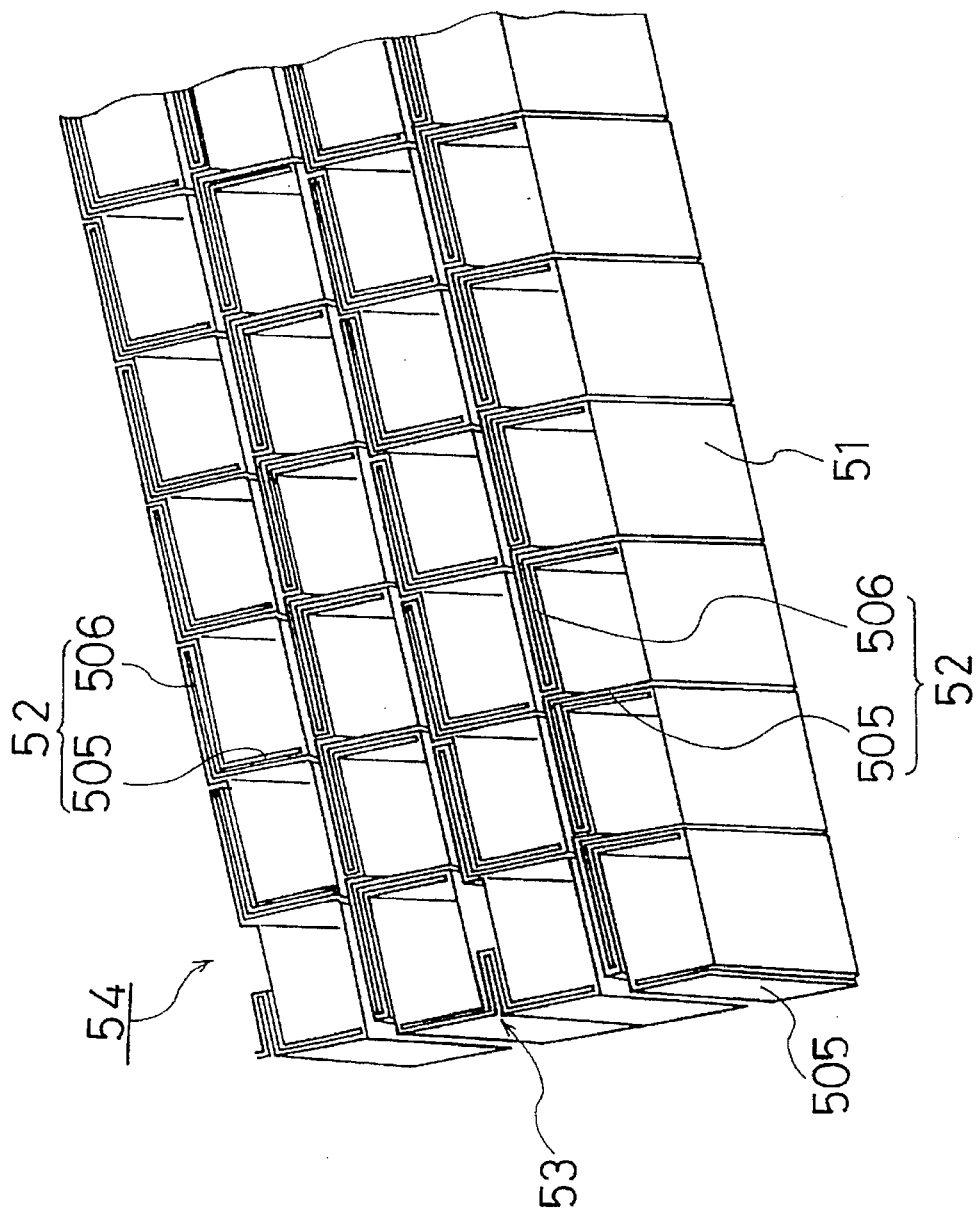
FIG. 16 is a perspective view of the structure of the PRTS shown in FIG. 15.
Figure 17:
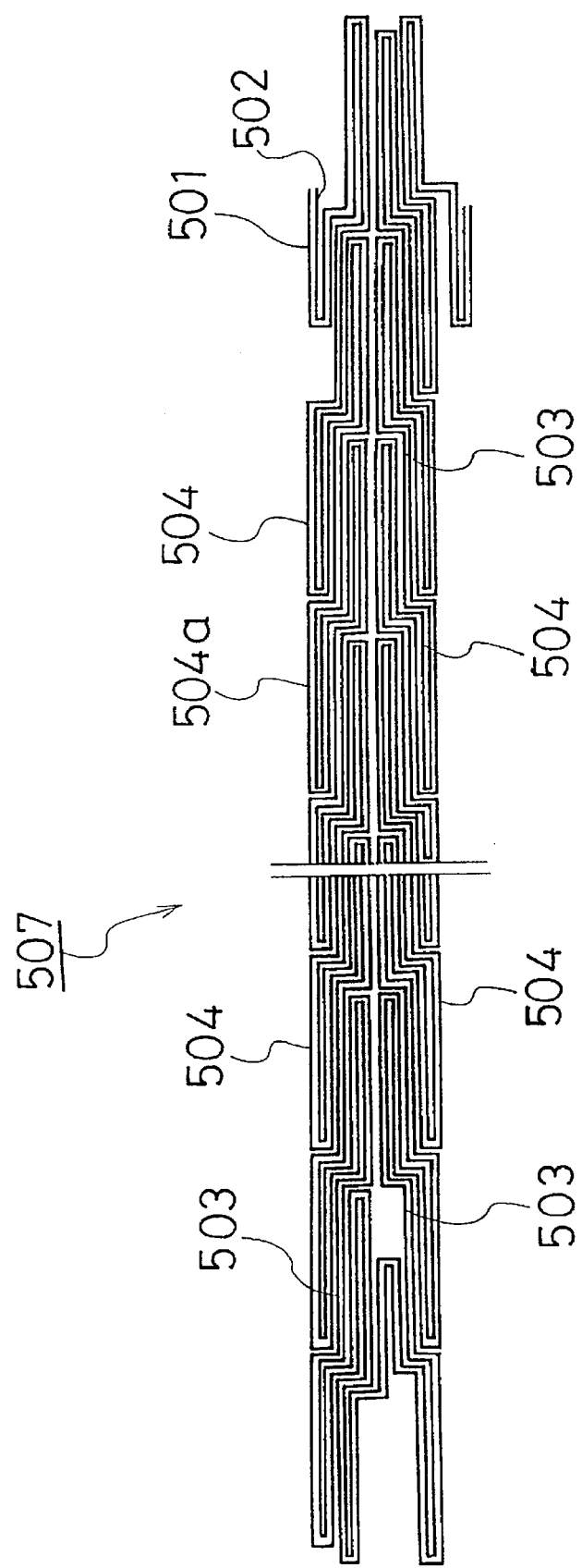
FIG. 17 is a side view of a flattened PRTS shown in FIG. 15.

FIGS. 15, 16 and 17 show the fifth embodiment of the present invention. In this fifth embodiment, a plurality of square cylinder pots 51 are assembled, each of which is connected by a connector portion 52. These pots 51 and the connector portion 52 constitute a band 53. The band 53 forms an assembled body 54 by being folded repeatedly at every given length. The connector portion 52 consists of a flattened portion 505 and two folded portions 506 formed adjacently to the front or rear portion of said connector portion respectively. The flattened portion 505 located between the individual pots 51 is adhered to individual pots 51 with a water-soluble paste and the folded portion 506 of the connector portion 52 is adhered to one side of the adjacent pot 51. Further, folded band 53 is adhered mutually through the folded portion 506 of the connector portion 52 with a water-soluble paste, thereby the assembled body 54 can keep individual pots 51 tightly in an assembled state.

In this case, the total length of the connector portion 52 is set by three times of one side width of the individual pot 51, while the flattened portion 505 is set identical with the width of one side of the pot 51. Accordingly, when developing the folded portion 506, the total length (elongated length) becomes twice of one side width, and by folding that elongated portion once, that corresponds to the one side of the pot 51.

In this fifth embodiment, the above band 53 is formed, as shown in FIG. 17, as well as in the first embodiment, by overlapping two sheets of films 501, 502 such as paper or the like. In this case, the portion corresponding to said individual pot 51 is formed as a not adhered portion 503 and the portion corresponding to the connector portion 52 is formed as an adhered portion 504 (colored in black) with two films 501, 502. The band 53 is supplied initially in the flattened state of the not adhered portion 503, in which it is folded alternately at a given length to form lamination 507. The adhered portion 504a is adhered to the not adhered portions 503 located at the front and rear thereof. Further, the not adhered portion 503 of the band adjacent to the adhered portion 504 is adhered to the whole surface of the adhered portion 504 including the adhered portion 504a with a water-soluble paste.

In the fifth embodiment of the present invention, when the lamination 507 shown in FIG. 17 is developed in the normal direction, the not adhered portion 503 is enlarged, thereby as shown in FIGS. 15 and 16, a Given size of assembled body 54 comes out, in which a plurality of honeycomb like pots 51 are developed. Accordingly, as in the first embodiment, keeping the pots developed, setting those in a seedling box (not shown), filling those with cultivation soil and seeding those are carried out. Then, after raising seedlings for given days, when drawing one end thereof, individual pots 51 are drawn out continuously through the elongated connector portions 52 and the raised seedlings are transplanted in the field at a Given pitch in accordance with the sliding of the above transplanting machine.

Figure 18:
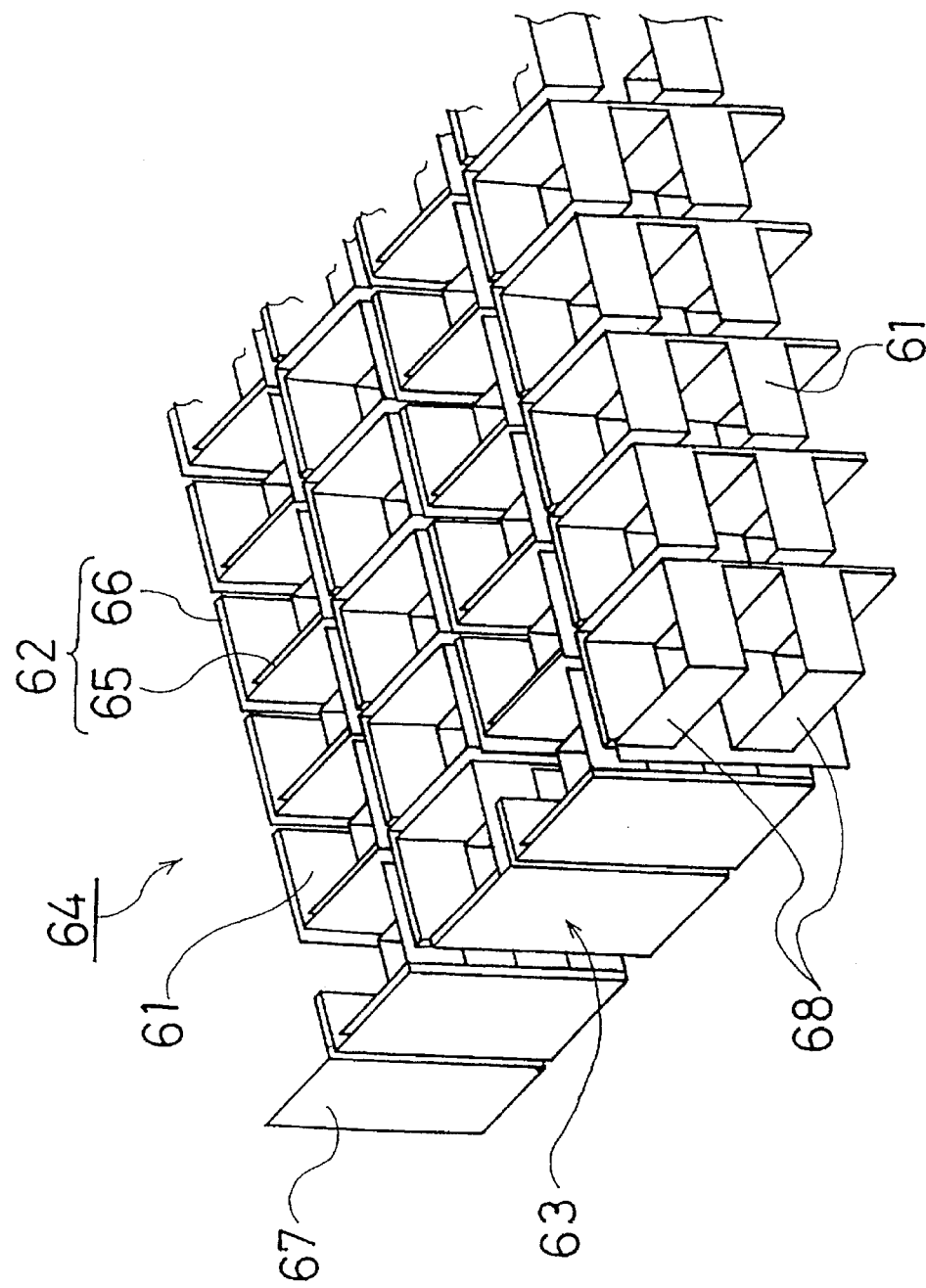
FIG. 18 is a plan view of the sixth embodiment of the PRTS according to the present invention.

FIG. 18 shows the sixth embodiment of the present invention. In this embodiment, as well as in the above fifth embodiment, a plurality of square and cylindrical pots 61 are assembled, in which a band 63 is formed by connecting many individual pots 61 with the connector portion 62 and this band 63 is folded at a given length to obtain an assembly body 64. The connector portion 62 is formed with a flattened portion 65 and the folded portion 66 provided at the front portion and at the rear portion of said flattened portion 65, and through the folded portions 66 the band 63 is adhered mutually with a water-soluble paste.

Further, the total length of the connector portion 62 is set, as well as in the fifth embodiment, three times of one side width of the pot 61, and the developed length of the folded portion 66 is set twice of the one side width of the pot 61. And the feature of the band 63 of the 6th embodiment resides in that, as well as in the third embodiment, the band is formed a sheet of film 67, and the divided strips 68 are developed in opposite direction to form an assembled body 64 in which a plurality of individual pots 61 are tightly assembled.

Figure 19:
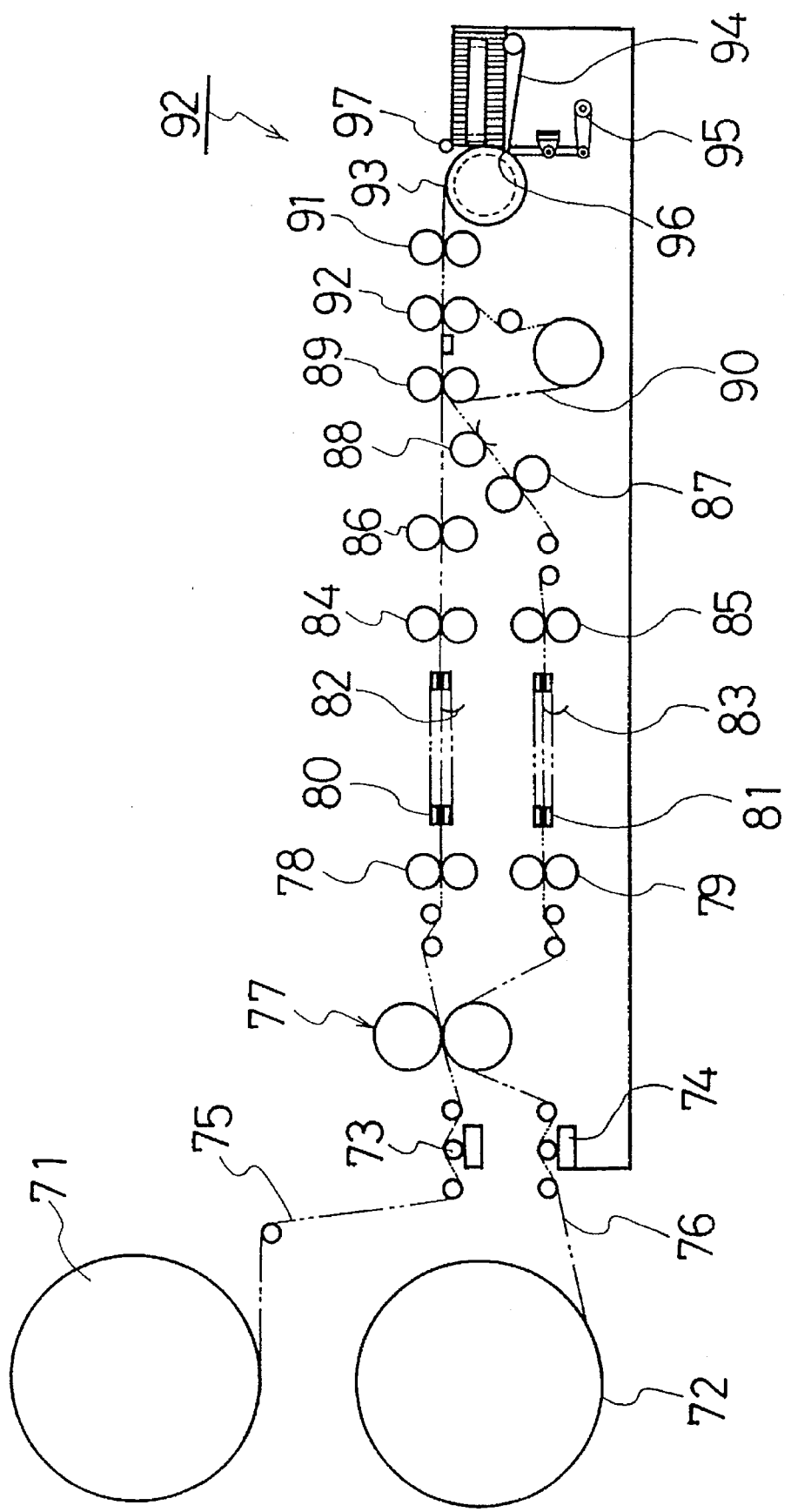
FIG. 19 shows a diagrammatical view of a manufacturing apparatus to prepare the PRTS of the present invention.

Here, the continuously assembled pots of the above are manufactured by the apparatus illustrated in FIG. 19 for instance. This apparatus is for manufacturing the continuously assembled pots of the above third embodiment. In this apparatus, two sheets of film 75 and 76 drawn out from two winding reels 71,72 through a tension detectors 73,74 are guided to a cutting-fold-lining apparatus 77 in overlapped state and provided with predetermined cuts and fold-lining. Subsequently, two sheets of films 75, 76 are transferred to a first pasting apparatus 78, 79 in separate manner, and a watersoluble paste is applied in accordance with a given pattern, then guided to a folding apparatus 80,81. In this folding apparatus 80, 81, each film 75, 76 is folded along the fold-lining to form the folded portion 303a (FIG. 10) of the no cutting portion 303, which is pasted with nozzle type of pasting apparatus 82, 83 respectively. And, these pasted portions are flattened by pull-roller 84, 85.

Further, in the folding apparatus 80, 81 both ends of the film 75, 76 are also folded in Z-letter like, which contributes to the connection of the band 33 (FIG. 10, numeral 306).

Then, two sheets of film 75, 76 are guided to the second pasting apparatus 86, 87 and on the upper-most surface of the folded portion 303a a water-soluble paste is applied. Subsequently a water-resistant paste is applied on the folded portion in Z-letter like of the film 76 by the side pasting apparatus 88. And, two sheets of film are overlapped by a pair of guide rollers 89 and transferred to a rotary cutter 91 through a vacuum conveyor 90. During this transfer, a water-resistant paste is applied on the folded portion in Z-letter like of the film 75 by the side pasting apparatus 92. By the rotary cutter 91 two sheets of film are cut off at a given length to form cut pieces, which are pasted in a given number of laminations by a lamination pasting apparatus 92.

For reference, the lamination pasting apparatus 92 comprises a vacuum roller 93, a transfer conveyor 94, crank link 95, a push-out piece 96 and a top-regulating roller 97 and said cut pieces are in turn supplied in upright posture on the transfer conveyor 94 by being supported with these elements.

As explained above, according to PRTS of the present invention, since the sides of the opposing bands are adhered with a water-soluble paste keeping the state in which the elongated portion of the connector portion is folded or as it is, the length of the connector portion can be settled arbitrarily without losing the tightly assembled state, whereby the pot seedlings can be transplanted at a desired roots spacing without cutting off individual pots from a line of pot seedlings by using a transplanting machine which can transplant such pot seedlings continuously.

What is claimed is:

1. Continuously assembled pots for raising and transplanting seedlings comprising a lamination formed by folding a band and adhering selected folded portions of the folded band with a water soluble paste, the band being formed by at least one sheet of film, and a plurality of square or hexagonal pots connected continuously with a connector portion being formed when developing the band by unfolding the laminate, the pots having a plurality of sides defining a hexagonal or square cross-sectional shape, each side having a length, wherein the connector portion extends between adjacent pots and has an elongated length an integral number of times as long as the length of the side of one of the plurality of pots, the integral number being at least 2, the connector portion being capable of folding into a plurality of overlapped sections each having a fold length equal to the length of the side of one of the plurality of pots.

2. Continuously assembled pots according to claim 1, wherein said elongated length of the connector portion is folded into the overlapped sections and adhered with a water-soluble paste between such overlapped sections and adhered on one side of one of the plurality of pots.

3. Continuously assembled pots according to claim 2, wherein one band is overlapped with another band, and the overlapped bands are adhered together through the overlapped section of the connector portion of each band.

4. Continuously assembled pots according to claim 1, wherein said band is formed with two sheets of film, individual pots of the plurality of pots are formed from non-adhered portions of said two sheets of film, and said connector portions are formed from adhered portions of said two sheets of film.

5. Continuously assembled pots for raising and transplanting seedlings comprising two bands overlapped with each other, each band being formed with at least one sheet of film, and having a plurality of hexagonal cylindrical pots to be formed by developing said band, a side of each hexagonal pot having a length, the pots being connected by connector portions, each connector portion extending between adjacent pots and having an elongated length 5 times the length of one side of each hexagonal pot, the connector portions being capable of folding into a plurality of overlapped sections each having a folded length equal to the length of one side of each hexagonal pot, so that a distance between the adjacent pots when the connector portion is folded into the plurality of overlapped sections equals the length of the side of each hexagonal pot, the bands being overlapped each other in such a way that an individual pot in one band is overlapped on a central portion of said connector portion of the other band to form a lamination as one unit, a plurality of said units being laminated in such a way that opposing units are shifted by a distance of two times the length of the side of the individual pot, said individual pots and said connector portion being adhered with a water-soluble paste.

6. Continuously assembled pots according to claim 5, wherein each band comprises two sheets of film, said individual pot is to be formed by a non-adhered portion of the film and said connector portion is to be formed by an adhered portion.

7. Continuously assembled pots according to claim 5, wherein each band is formed with one sheet of film and said individual pot is to be formed by developing alternately and in opposite direction a plurality of strips divided by cutting horizontally along a length of the sheet.

8. Continuously assembled pots according to claim 1, wherein said individual pots and connector portions are formed separately and ends of the connector portions are adhered to ends of individual pots with a water-resistant paste.

* * * * *